United States Patent [19]

Sakamoto

[11] Patent Number: 6,154,718
[45] Date of Patent: *Nov. 28, 2000

[54] METHOD, APPARATUS AND COMPUTER PROGRAM PRODUCT FOR SIMULATING DIFFUSION OF IMPURITIES IN A SEMICONDUCTOR

[75] Inventor: Hironori Sakamoto, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/041,504

[22] Filed: Mar. 12, 1998

[30] Foreign Application Priority Data

Mar. 12, 1997 [JP] Japan .................................. 9-057556

[51] Int. Cl.⁷ .............................. G06G 7/48; G06G 7/58
[52] U.S. Cl. ................................... 703/12; 703/2; 703/3; 703/13
[58] Field of Search .......................... 364/578; 395/500; 703/2, 3, 6, 13

[56] References Cited

U.S. PATENT DOCUMENTS

| | | | |
|---|---|---|---|
| 4,599,118 | 7/1986 | Han et al. | 438/291 |
| 5,504,016 | 4/1996 | Aronowitz | 438/5 |
| 5,784,302 | 7/1998 | Kumashiro | 395/500.34 |

FOREIGN PATENT DOCUMENTS 6-283458  10/1994  Japan .

OTHER PUBLICATIONS

The Efficient Simulation of Coupled Point Defect and Impurity Diffusion XP–002126436.

A New Approach to the Simulation of the Coupled Point Defects and Impurity Diffusion XP–002126435.

Fast Simulation of Coupled Defect–Impurity Diffusion in Findpro: Comparision with Suprem–IV and Other Programs XP–000857501.

A New High–Speed Non–Equilibrium Point Defect Model for Annealing Simulation XP–000863148.

Abstract Translation of "Technology of Process Device Simulator (translated title)" by Ryo Dan, Sangyo–Tosho Publishing Company, pp. 18–79, Apr. 20, 1990.

A Model for Boron Short Time Annealing After Ion Implantation Masami Hane and Hiroshi Matsumoto, Member, IEEEV, vol. 40, No. 7, Jul. 1993, pp. 1215–1222.

Modeling high–concentration boron diffusion under amorphization conditions Bruno Baccus, Eric Vandenbossche and Michel Lannoo; vol. 77, No. 11, Jun. 1995, pp. 1–12.

Kao et al, "Investigation of the Electron Transfer Characteristics in Multi–delta–Doped GaAs FET's", IEEE Transactions on Electron Devices, vol. 43 issue 8, pp. 1181–1186, 1996.

*Primary Examiner*—Kevin J. Teska
*Assistant Examiner*—Samuel Broda

[57] ABSTRACT

A distribution of the concentration of initial point-defects which generate in an ion implanting process is obtained with an ion implanting simulator. As a local function of the distribution, the distribution of the intensity of absorption of point-defects is obtained. A term of absorption of point-defects obtained from the distribution of the intensity is included in a diffusion equation. With the resultant diffusion equation, the diffusion simulation is performed. Thus the simulation using the diffusion equation may be extended to two or three dimension and cope with various ion implanting conditions.

33 Claims, 6 Drawing Sheets

AFTER ANNEALING AT 920°C FOR 30 MIN. SUBSEQUENT TO ION IMPLANTATION OF PHOSPHORUS OF $1 \times 10^{-15} cm^{-2}$ AT 40 keV

METHOD, APPARATUS AND COMPUTER PROGRAM PRODUCT FOR SIMULATING DIFFUSION OF IMPURITIES IN A SEMICONDUCTOR

BACKGROUND OF THE INVENTION

1. Field of the Invention

The present invention relates to a computer simulating method applied to a semiconductor fabrication process and, in particular, to an impurity diffusion simulating method which takes point-defects into account.

2. Description of the Prior Art

Using a computer, a process simulator calculates and predicts physical amounts and shapes of impurity profiles in a device fabricated by a semiconductor LSI fabrication process including an ion implanting process and an ion diffusing process. When the semiconductor LSI fabrication process is optimized for the maximum electric characteristics using the process simulator, the cost and time for designing LSI chips can be remarkably reduced as compared to the case that many experimental LSI chips are made and tested. In addition, since the process simulator calculates physical amounts of a semiconductor device, it can analyze actions of impurities in the semiconductor device. For details of the process simulator, refer to "Technology of Process Device Simulator (translated title)", by Ryo Dan, Sangyo-Tosho Publishing Company, pp 18–79, Apr. 20, 1990.

In the diffusion simulation for calculating a diffusion process, diffusion equations for individual impurities should be solved to analyze the action of impurities. Point-defects such as interstitial silicon atoms and holes that generate in the ion implanting process interact with implanted impurities. Thus, the impurities acceleratedly diffuse. This phenomenon is explained in "A model for Boron Short Time Annealing After Ion Implantation", IEEE Transactions on Electron Devices, Vol. 40, No. 7, pp. 1215–1222, July, 1993. To simulate such a phenomenon with a computer, diffusion equations for point-defects such as interstitial silicon atoms and holes should be also solved.

On the other hand, the region where a large number of point-defects generate during the ion implanting process become amorphous because the crystal structure of the region deteriorates. When the region is annealed consequently, the amorphous layer is re-crystallized at the beginning. At the interface between the re-crystallized region and the non-amorphous region, point-defects such as interstitial silicon atoms and holes are absorbed, thereby affecting the diffusion of the impurities.

To simulate such a phenomenon on a computer, a term with respect to the absorption of point-defects such as interstitial silicon atoms or holes is included in a diffusion equation. The term with respect to the absorption of point-defects is denoted by $R(x, t, T)$. The term $R(x, t, T)$ is expressed as follows:

$$R(x, t, T) = K(x, T)[C(x, t) - C^*(T)] \quad (1),$$

where x represents an analytic coordinate vector; t represents an analytic time; T represents an analytic temperature; $K(x, T)$ represents the intensity with which point-defects are absorbed; $c(x, t)$ represents a distribution of the concentration of point-defects; and $C^*(T)$ represents the concentration of point-defects at the thermal equilibrium.

When the term $R(x, t, T)$ is included in the diffusion equation, to accurately simulate the diffusion of impurities, the intensity $K(x, T)$ should be correctly estimated corresponding to the ion implanting condition.

In a one-dimensional diffusion simulation, as explained in "Modeling high-concentration boron diffusion under amorphization conditions" by Bruno Baccus, Eric Vandenbossche, and Michel Lannoo, Journal of Applied Physics, Vol. 77, No. 11, pp. 5630–5641, June, 1995, the intensity $K(x, T)$ of the absorption of point-defects is expressed by an experiential analytic equation.

In this method, as shown in FIG. 5, using the ion implanting simulator, the distribution in the depth direction of an initial concentration of point-defects (represented by a curve 51) which generate in the ion implanting process is obtained. The distribution is denoted by $C_D(x)$. With the coordinate (depth) $x_\alpha$ where the initial concentration of point-defects is equal to a particular value $C_{D,\alpha}$, the intensity $K(x, T)$ (represented by a curve 52) is expressed as follows:

$$K(x, T) = \alpha(T)\exp\left[-\frac{(x - x_\alpha)^2}{x_\omega}\right], \quad (2)$$

where $\alpha(T)$ and $X\omega$ are parameters.

However, in the conventional diffusion simulation, to obtain the intensity by which point-defects are absorbed, the coordinate $x_\alpha$ had to be obtained from the concentration of initial point-defects that generate in the ion implanting process. Thus, it was difficult to extend the diffusion simulation to a two-dimensional or three-dimensional simulation. In addition, since a parameter that can be obtained from the ion implanting condition is only $x_\alpha$, it was difficult to determine a parameter that allows the simulation to be accurately performed in a different ion implanting condition.

SUMMARY OF THE INVENTION

The present invention is made from the above-explained point of view. An object of the present invention is to provide a diffusion simulating method that can be extended to a two-dimensional or three-dimensional simulation and that can be used in various ion implanting conditions.

According to an aspect of the present invention, there is provided a method for simulating the diffusion of impurities during ion implanting process and thermal diffusion process in a semiconductor LSI fabrication, which comprises the steps of: obtaining the intensity of absorption of point-defects in a substrate during the thermal diffusion process as a local function of a distribution of an initial concentration of point-defects that generate during the ion implanting process of which the argument is an analytic coordinate vector that is represented by one-dimensional coordinates, two-dimensional coordinates, or three-dimensional coordinates; and including a term representing the absorption of impurities by the point-defects in a diffusion equation, the term being obtained with the intensity of absorption of the point-defects.

The point-defects may be interstitial silicon atoms, holes, or complex point-defects consisting of interstitial silicon atoms and impurities or consisting of holes and impurities.

The intensity of absorption may be obtained as a local function with plural arguments of which each is the initial concentration of the point-defect intensity which generates during each of the ion implanting process.

The intensity of absorption also may obtained as a local function of the initial concentration of the point-defect intensity which is modified corresponding to another thermal diffusion subsequent to the ion implanting process.

These and other objects, the features and advantages of the present invention will become more apparent in light of the following detailed description of best mode embodiments thereof, as illustrated in the accompanying drawings.

DESCRIPTION OF PREFERRED EMBODIMENTS

Next, with reference to the accompanying drawings, a first embodiment of the present invention will be explained.

Figure 1:
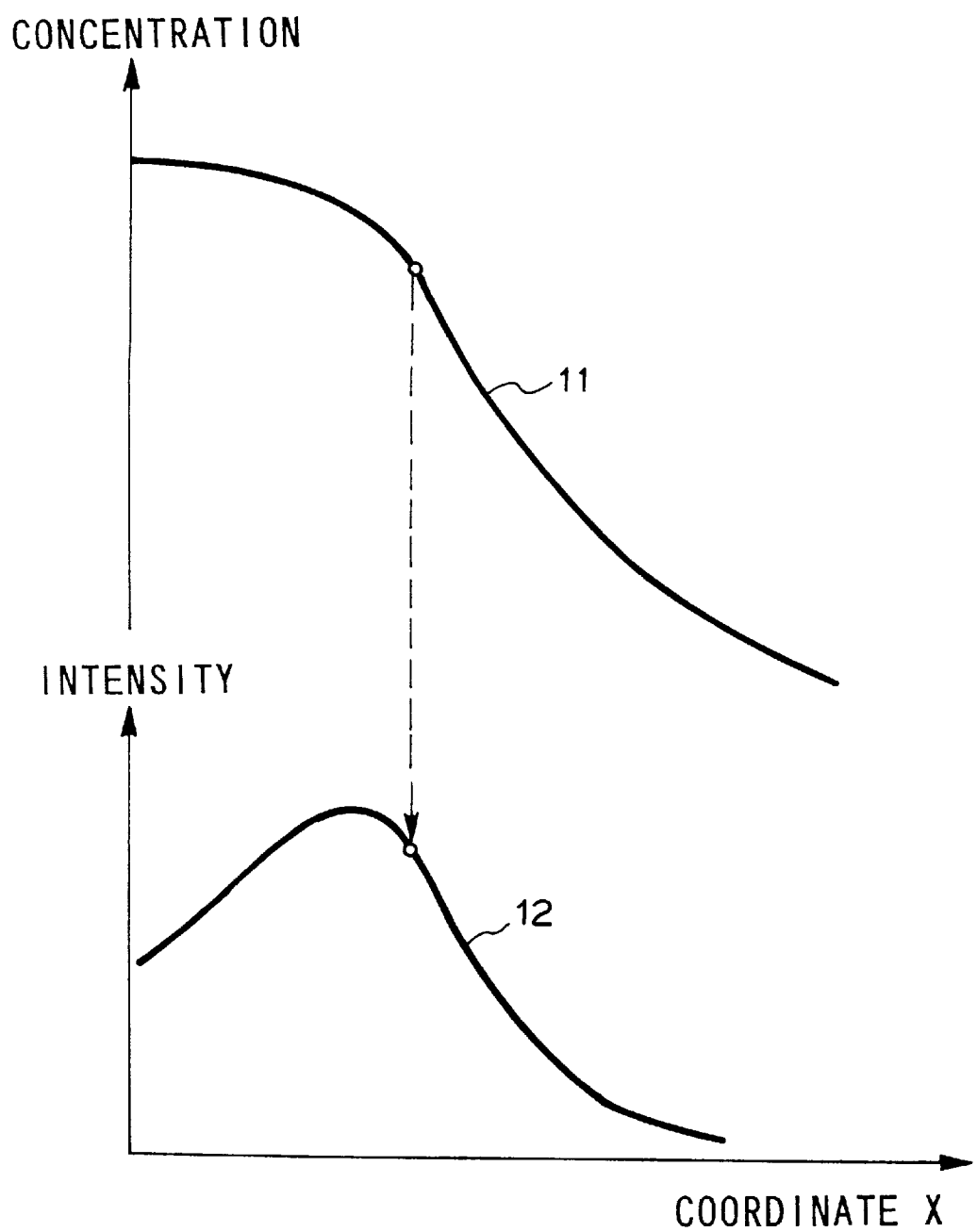
FIG. 1 is a graph for explaining a method for obtaining the intensity of absorption of interstitial silicon in a diffusion simulating method according to a first embodiment of the present invention.

FIG. 1 is a graph for explaining the method of deriving the intensity of absorption of interstitial silicon (hereinafter referred to as suffix I), that is point-defects, in a diffusion simulating method according to the first embodiment of the present invention.

In this embodiment, the concentration $C_D(x)$ of initial point-defects (represented by curve 11 in FIG. 1) that generate in the ion implanting process is obtained with an ion implanting simulator. As a local function of the distribution of the concentration $C_D(x)$, the distribution of the intensity of absorption of interstitial silicon (represented by curve 12) is obtained. The distribution of the intensity $K_I(x, T)$ is obtained with the following equation.

$$K_I(x, T) = f_I(C_D(x), T) \quad (3),$$

where x represents an analytic coordinate vector that may be represented by two-dimensional or three-dimensional positional coordinates as well as one-dimensional positional coordinates.

Using the intensity $K_I(x, T)$ of the absorption of interstitial silicon, a term $R_I(x, t, T)$ with respect to the absorption of interstitial silicon is expressed as follows:

$$R_I(x, t, T) = K_I(x, T)[C_I(x, t) - C^*_I(T)] \quad (4),$$

where $C_I(x, t)$ represents the distribution of concentration of interstitial silicon; and $C^*_I(T)$ represents the concentration of interstitial silicon at the thermal equilibrium.

The form of function $f_I(C, T)$ is selected in such a manner that the diffusion simulation can be accurately performed even if the variation is introduced in ion implanting conditions such as implanted dose amount and energy of implanted ions and in diffusing conditions such as diffusion temperature and diffusion time. For example, function $f_I(C, T)$ can be expressed as the following polynomial:

$$K_I(x, T) = \sum_{i=1}^{n} K_i(T)(C_D)^i \quad (5)$$

$$K_i(T) = A_i \exp\left[-\frac{qB_i}{k_B T}\right], \quad (6)$$

where q represents the amount of elementary electric charge; and $k_B$ represents Boltzmann constant.

Figure 2:
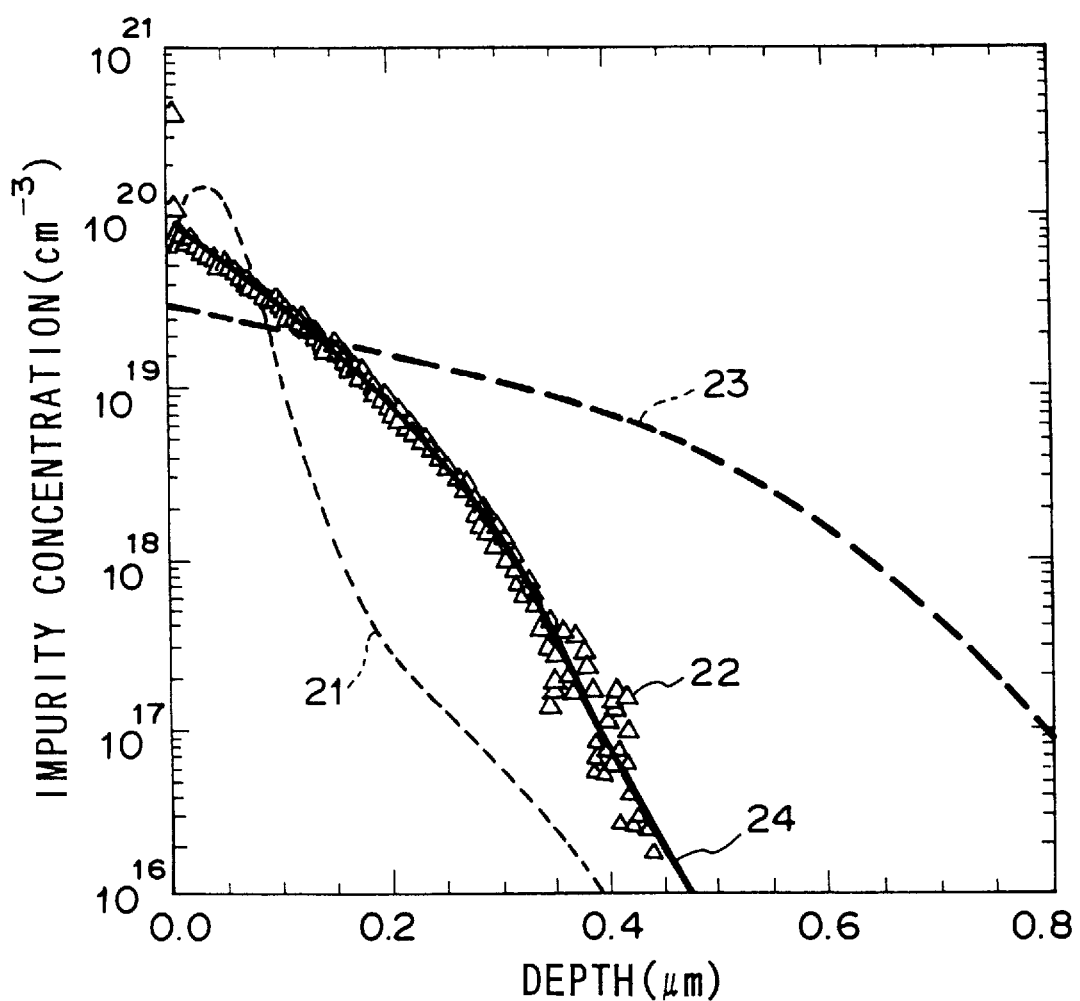
FIG. 2 is a graph showing the relation between the results of the impurity diffusion simulation of the method according to the first embodiment and measured values of the impurity concentration.

FIG. 2 shows results of a one-dimensional impurity diffusion simulation using the point-defects absorption term represented by the polynomial. In FIG. 2, curve 21 represents a distribution of the concentration of phosphorus just after the ion implanting process is performed. Each point of curve 22 represents an actually measured value of the concentration of phosphorus after the annealing is performed. Curve 23 represents the simulation result of the distribution of the concentration of phosphorous after the annealing in the case that the diffusion equation does not include the point-defects absorption term. On the other hand, curve 24 represents the simulation result of the distribution of the concentration of phosphorous after the annealing in the case that the diffusion equation includes the point-defects absorption term. As shown in FIG. 2, when the diffusion equation includes the point-defects absorption term, the result of the diffusion simulation exactly match the measured values.

Next, a second embodiment of the present invention will be explained.

The different point of this embodiment from the first embodiment is that the intensity of absorption of holes (hereinafter denoted by suffix V) is used instead of interstitial silicon atoms.

In the second embodiment, the distribution of the intensity of absorption of holes is obtained as a local function of the distribution of an initial concentration $C_D(x)$ of point-defects that generate in the ion implanting process. The local function is expressed as follows:

$$K_V(x, T) = f_V(C_D(x), T) \quad (7).$$

The term $R_V(x, t, T)$ representing the absorption of holes is expressed as follows:

$$R_V(x, t, T) = K_V(x, T)[C_V(x, t) - C^*_V(T)] \quad (8),$$

where $C_V(x, t)$ represents the distribution of the concentration of holes; and $C^*_V(T)$ represents the concentration of holes at the thermal equilibrium.

The term $R_V(x, t, T)$ is included in the diffusion equation.

Next, a third embodiment of the present invention will be explained.

The different point of this embodiment from the former two embodiments is that the intensity of absorption of complex point-defects consisting of interstitial silicon atoms and impurity atoms or consisting of holes and impurity atoms is used.

In the third embodiment, the distribution of the intensity of complex point-defects (hereinafter denoted by a suffix X) is obtained as a local function of a distribution of an initial concentration $C_D(x)$ of point-defects that generate in the ion implanting process. This local function is expressed as follows:

$$K_X(x, T) = f_X(C_D(x), T) \quad (9).$$

The term $R_X(x, t, T)$ representing the absorption of complex points is expressed as follows:

$$R_X(x, t, T) = K_X(x, T)[C_X(x, t) - C^*_X(T)] \quad (10),$$

where $C_X(x, t)$ represents the distribution of the concentration of complex point-defects; and $C^*_X(T)$ represents the distribution of the concentration of the complex point-defects at the thermal equilibrium.

The term $R_X(x, t, T)$ is included in the diffusion equation.

Next, with reference to FIG. 3, a fourth embodiment of the present invention will be explained.

Figure 3:
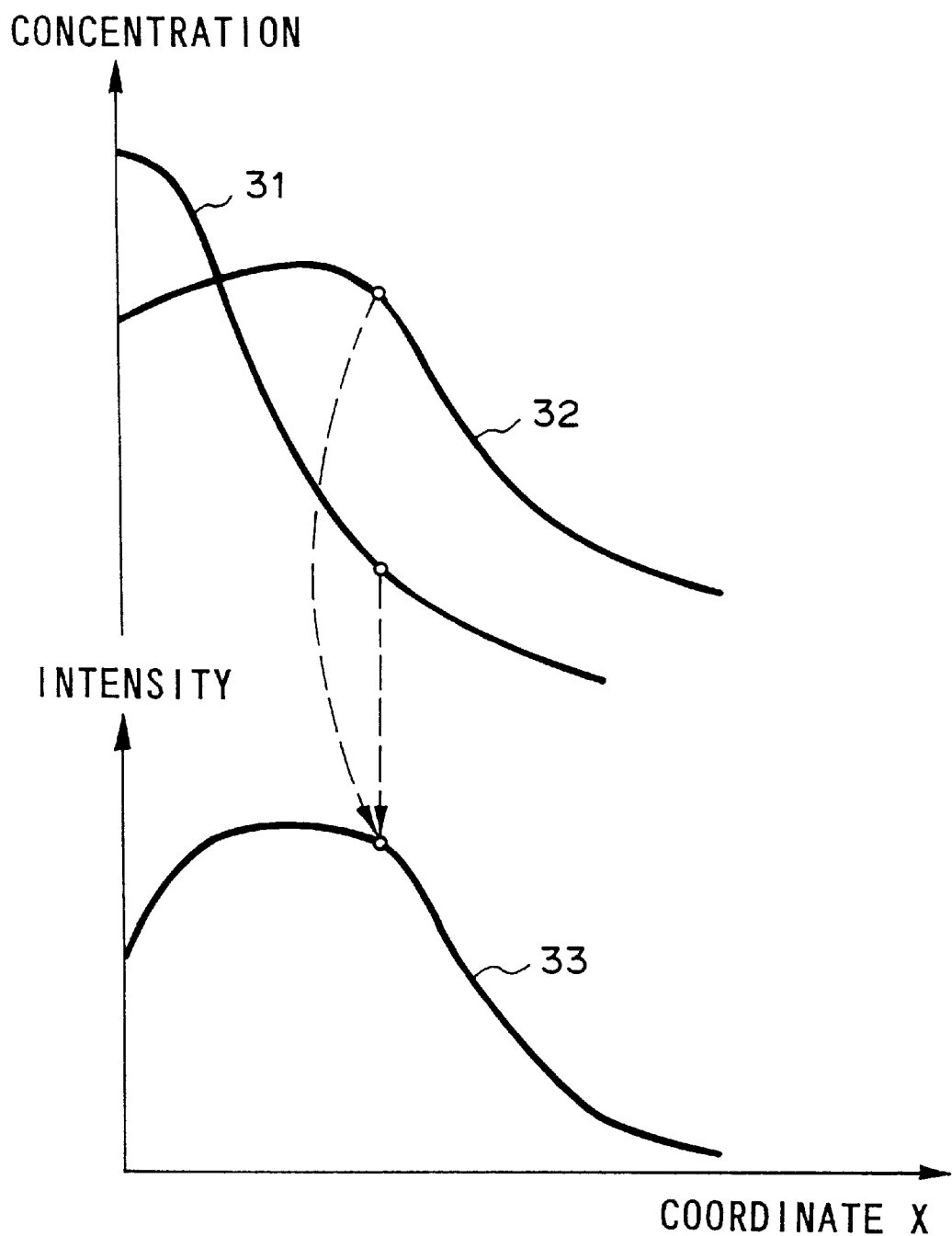
FIG. 3 is a graph for explaining a method for obtaining the intensity of absorption of point-defects in a diffusion simulating method according to a fourth embodiment of the present invention.

FIG. 3 diagramatically shows a simulating method for obtaining the intensity of absorption of point-defects according to the fourth embodiment of the present invention.

The different point of the fourth embodiment from the former three embodiments is that the ion implanting process is performed several times.

Corresponding to the case that the ion implanting process is performed a plurality of times before annealing, a distribution of an initial concentration $C^i_D(x)$ of point-defects, where i represents the serial number of each implantation process, is obtained using the ion implanting simulator for each ion implanting process as shown in FIG. 3 in which, for example, a couple of distributions are represented by curves 31 and 32.

In this embodiment, a distribution (represented by curve 33) of the intensity of absorption of point-defects is expressed as a function of which arguments are initial concentrations of point-defects. This function is expressed as follows:

$$K(x, T) = f(C^1_D(x), C^2_D(x), \ldots, C^i_D(x), \ldots, T) \quad (11).$$

Next, a fifth embodiment of the present invention will be explained.

Figure 4:
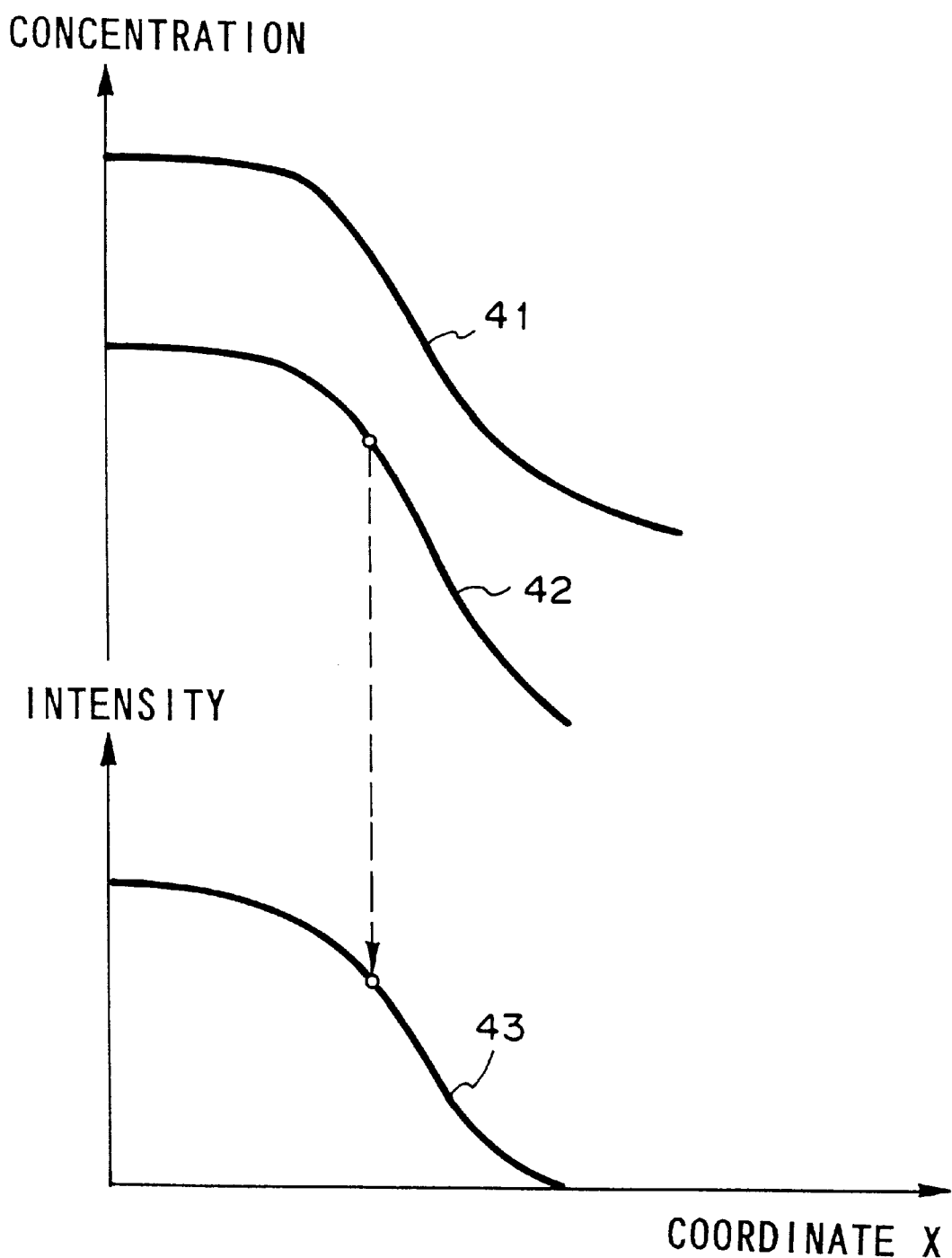
FIG. 4 is a graph for explaining a method for obtaining the intensity of absorption of point-defects in a diffusion simulating method according to a fifth embodiment of the present invention.
Figure 5:
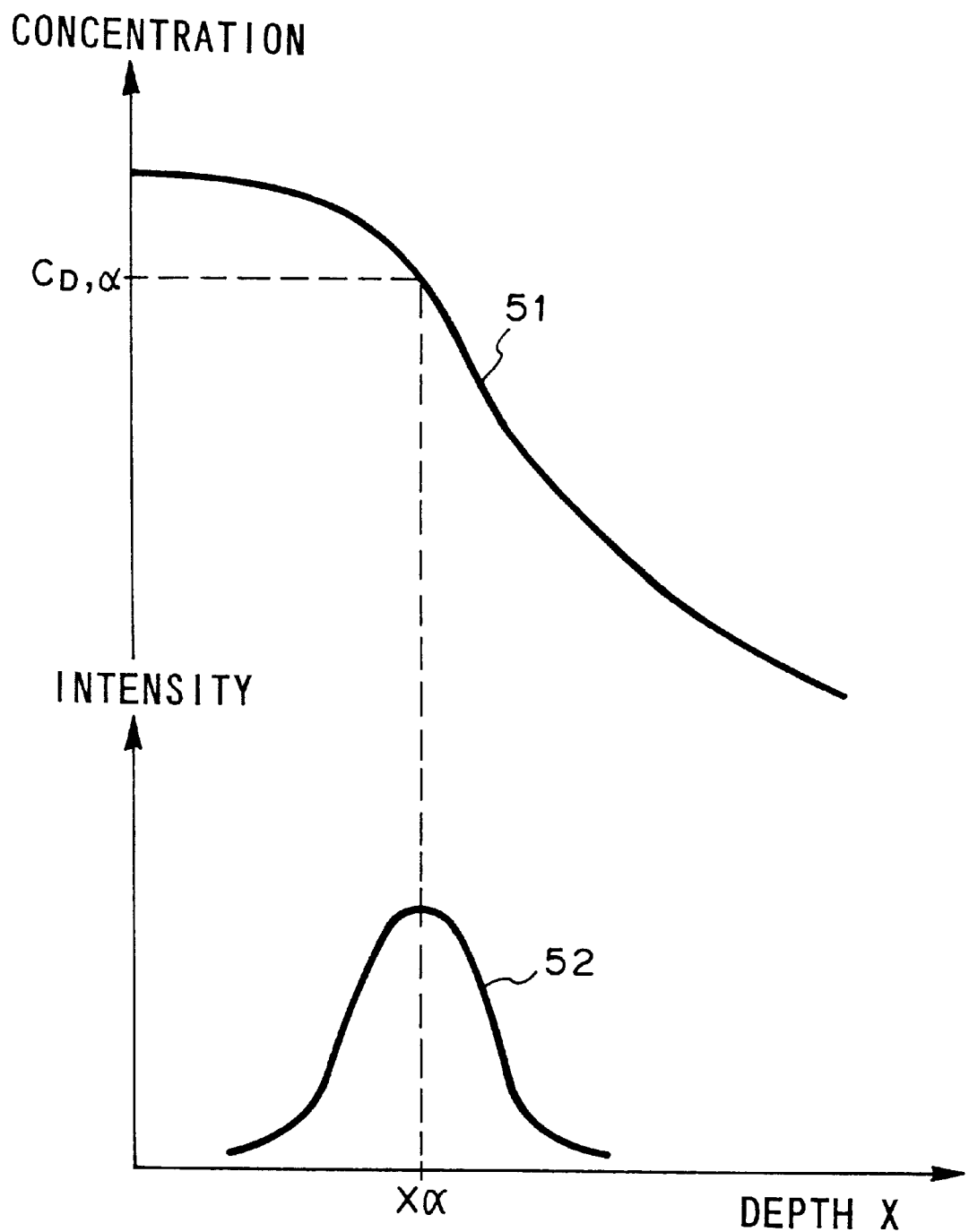
FIG. 5 is a graph for explaining a conventional method for obtaining the intensity of absorption of point-defects.

FIG. 4 diagramatically shows a simulating method for obtaining the intensity of absorption of point-defects according to the fifth embodiment of the present invention.

The different point of the fifth embodiment from the former four embodiments is that another annealing is inserted between ion implanting process and the annealing under simulation.

The distribution (represented by curve 41) of the initial concentration $C_D(x)$ of point-defects that generates when the ion implanting process is performed varies at the time when the another annealing is subsequently applied. Thus, in the fifth embodiment, the distribution (represented by curve 43) of the intensity of absorption of point-defects is expressed as a function of an initial concentration (represented by curve 42) of point-defects $C'_D(x)$ which has been varied after the another annealing. This function is expressed as follows:

$$K(x, T) = f(C'_D(x), T) \quad (12).$$

As explained above, according to the diffusion simulating method of the present invention, the diffusion of impurities can be simulated in a two-dimensional space or a three-dimensional space as well as a one-dimensional space with a diffusion equation including a term representing the absorption of point-defects. Moreover the diffusion simulation can cope with various conditions of the ion implanting process such as multiple ion implantation and annealing after ion implantation, thus the practicability of the diffusion simulation can be enhanced.

Figure 6:
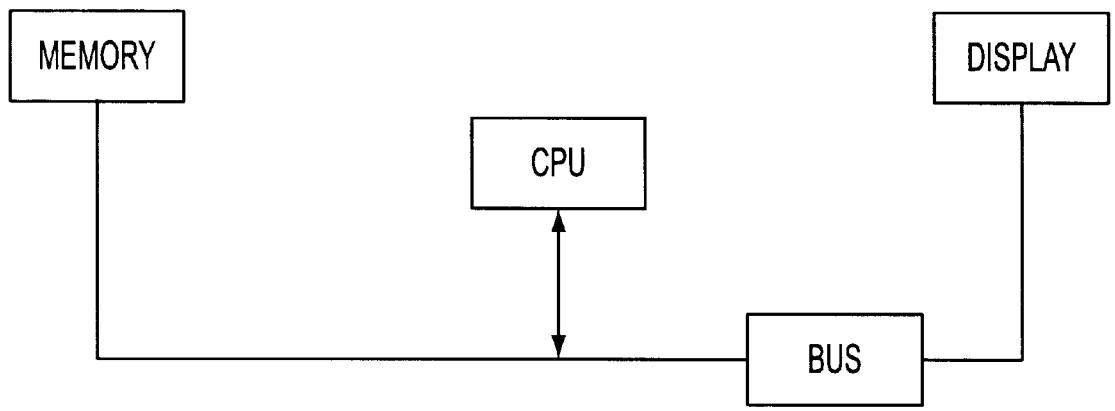
FIG. 6 shows a block diagram of the apparatus according to the present invention.
Figure 7:
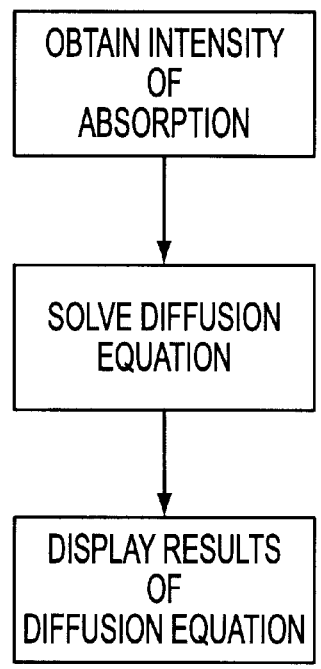
FIG. 7 shows a flow chart of the method according to the present invention.

FIGS. 6 and 7 show the apparatus and flow chart according to the present invention, respectively Preferably, the present invention is a computer program executing in a computer system which comprises a central processing unit, a main memory, a secondary memory, and a bus connecting the central processing unit, the main memory, and the secondary memory and a means for displaying results. The computer program is stored in the secondary memory. The computer program resides in a main memory during execution. The computer program includes instructions which causes the central processing unit to perform the functions or methods explained above.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. A method for simulating the diffusion of impurities during ion implanting process and thermal diffusion process in a semiconductor LSI fabrication, which comprises the steps of:

(a.) obtaining an intensity of absorption of point-defects in a semiconductor substrate during said thermal diffusion process, said intensity being represented by a local function of a distribution of an initial concentration of point-defects which generate during the ion implanting process, an argument of said distribution is an analytic coordinate vector;

(b.) generating a diffusion equation including a term representing absorption of impurities by said point-defects said term containing as a factor said intensity of the absorption of the point-defects;

(c.) solving said diffusion equation generated at step (b); and (d.) displaying the results of step (c.) of solving said diffusion equation in a graph application, wherein the diffusion of impurities during the ion implanting process and thermal diffusion process for a given distribution of the initial concentration of point defects is anticipated before performing the ion implanting process and thermal diffusion process.

2. The method as set forth in claim 1, wherein said point-defects are interstitial silicon atoms.

3. The method as set forth in claim 1, wherein said point-defects are holes.

4. The method as set forth in claim 1, wherein said point-defects are complex point-defects consisting of interstitial silicon atoms and impurities.

5. The method as in one of claims 1–4,
   wherein, said ion implanting process is performed a plurality of times before said thermal diffusion process, said intensity of absorption from step (a) is obtained as a local function with plural arguments of which each argument is the initial concentration of the point-defect intensity which generates during each of said ion implanting process.

6. The method as set forth in claim 5,
   wherein said intensity of absorption from step (a.) is obtained as a local function of the initial concentration of the point-defect intensity which is modified based on the thermal diffusion subsequent to said ion implanting processes.

7. The method as in one of claims 1–4,
   wherein said intensity of the absorption from step (a.) is obtained as a local function of the initial concentration of the point-defect intensity which is modified corresponding to another thermal diffusion subsequent to said ion implanting process.

8. A method for simulating the diffusion of impurities according to as set forth in claim 1, wherein the analytic coordinate vector is represented by one-dimensional coordinates.

9. The method for simulating the diffusion of impurities according to as set forth in claim 1, wherein the analytic coordinate vector is represented by two-dimensional coordinates.

10. The method for simulating the diffusion of impurities according to as set forth in claim 1, wherein the analytic coordinate vector is represented by three-dimensional coordinates.

11. The method for simulating the diffusion of impurities according to as set forth in claim 1, wherein said point defects are complex point defects consisting of holes and impurities.

12. An apparatus for simulating the diffusion of impurities during ion implanting process and thermal diffusion process in a semiconductor LSI fabrication, which comprises:
- (a.) means for obtaining the intensity of absorption of point-defects in a semiconductor substrate during said thermal diffusion process, said intensity being represented by a local function of a distribution of an initial concentration of point-defects which generate during the ion implanting process, an argument of said distribution is an analytic coordinate vector;
- (b.) means for generating a diffusion equation including a term representing absorption of said impurities by said point-defects in a diffusion equation, said term containing as a factor said intensity of the absorption of the point-defects;
- (c.) means for solving said diffusion equation; and
- (d.) means for displaying the result of solving said diffusion equation in a graph application, wherein the diffusion of impurities during the ion implanting process and thermal diffusion process for a given distribution of the initial concentration of point defects is anticipated before performing the ion implanting process and thermal diffusion process.

13. The apparatus as set forth in claim 12, wherein said point-defects are interstitial silicon atoms.

14. The apparatus as set forth in claim 12, wherein said point-defects are holes.

15. The apparatus as set forth in claim 12, wherein said point-defects are complex point-defects consisting of interstitial silicon atoms and impurities.

16. The apparatus as in one of claims 8–15,
- wherein, said ion implanting process is performed a plurality of times before said thermal diffusion process, said intensity of absorption from means (a.) is obtained as a local function with plural arguments of which each argument is the initial concentration of the point-defect intensity which generates during each of said ion implanting process.

17. The apparatus as set forth in claims 16,
- wherein said intensity of absorption from means (a.) is obtained as a local function of the initial concentration of the point-defect intensity which is modified based on the thermal diffusion subsequent to said ion implanting processes.

18. The apparatus as in one of claims 12–15,
- wherein said intensity of absorption from means (a.) is obtained as a local function of the initial concentration of the point-defect intensity which is modified corresponding to another thermal diffusion subsequent to said ion implanting process.

19. The apparatus for simulating the diffusion of impurities according to as set forth in claim 12, wherein the analytic coordinate vector is represented by one-dimensional coordinates.

20. The apparatus for simulating the diffusion of impurities according to as set forth in claim 12, wherein the analytic coordinate vector is represented by two-dimensional coordinates.

21. The apparatus for simulating the diffusion of impurities according to as set forth in claim 12, wherein the analytic coordinate vector is represented by three-dimensional coordinates.

22. The apparatus for simulating the diffusion of impurities according to as set forth in claim 12, wherein said point defects are complex point defects consisting of holes and impurities.

23. A computer program product comprising a computer useable medium having computer program logic stored therein, said computer program logic comprising:
- (a.) means for obtaining the intensity of absorption of point-defects in a substrate during said thermal diffusion process, said intensity being represented by a local function of a distribution of an initial concentration of point-defects which generate during the ion implanting process, an argument of said distribution is an analytic coordinate vector;
- (b.) means for generating a diffusion equation including a term representing absorption of impurities by said point-defects, said term containing as a factor said intensity of the absorption of the point-defects;
- (c.) means for solving said diffusion equation; and
- (d.) means for displaying the graphical results from solving said diffusion equation.

24. The computer program product as set forth in claim 23, wherein said point-defects are interstitial silicon atoms.

25. The computer program product as set forth in claim 23, wherein said point-defects are holes.

26. The computer program product as set forth in claim 23, wherein said point-defects are complex point-defects consisting of interstitial silicon atoms and impurities.

27. The computer program product as in one of claims 23–26,
- wherein, said ion implanting process is performed a plurality of times before said thermal diffusion process, said intensity of absorption from means (a.) is obtained as a local function with plural arguments of which each argument is the initial concentration of the point-defect intensity which generates during each of said ion implanting process.

28. The computer program product as set forth in claims 27,
- wherein said intensity of absorption from means (a.) is obtained as a local function of the initial concentration of the point-defect intensity which is modified based on the thermal diffusion subsequent to said ion implanting processes.

29. The computer program product as in one of claims 23–26,
- wherein said intensity of absorption from means (a.) is obtained as a local function of the initial concentration of the point-defect intensity which is modified corresponding to another thermal diffusion subsequent to said ion implanting process.

30. The computer program product as set forth in claim 23, wherein said analytic coordinate vector is represented by one-dimensional coordinates.

31. The computer program product as set forth in claim 23, wherein said analytic coordinate vector is represented by two-dimensional coordinates.

32. The computer program product as set forth in claim 23, wherein said analytic coordinate vector is represented by three-dimensional coordinates.

33. The computer program product as set forth in claim 23, wherein said point defects are complex point defects consisting of holes and impurities.

* * * * *